US012606180B2

(12) United States Patent
Flumeri et al.

(10) Patent No.: US 12,606,180 B2
(45) Date of Patent: Apr. 21, 2026

(54) APPARATUS AND METHOD FOR ESTIMATING A GRIP FACTOR OF A WHEEL OF A ROAD VEHICLE AND RELATIVE ROAD VEHICLE

(71) Applicant: FERRARI S.p.A., Modena (IT)

(72) Inventors: Alessandro Flumeri, Modena (IT); Andrea Fuso, Modena (IT)

(73) Assignee: FERRARI S.P.A., Modena (IT)

( * ) Notice: Subject to any disclaimer, the term of this patent is extended or adjusted under 35 U.S.C. 154(b) by 567 days.

(21) Appl. No.: 17/872,410

(22) Filed: Jul. 25, 2022

(65) Prior Publication Data

US 2023/0037354 A1      Feb. 9, 2023

(30) Foreign Application Priority Data

Aug. 3, 2021      (IT) ........................ 102021000020948

(51) Int. Cl.
B60W 40/101          (2012.01)
B60W 50/00          (2006.01)

(52) U.S. Cl.
CPC .......... B60W 40/101 (2013.01); B60W 50/00 (2013.01); *B60W 2050/0022* (2013.01); *B60W 2050/0052* (2013.01); *B60W 2510/20* (2013.01); *B60W 2520/10* (2013.01); *B60W 2520/125* (2013.01); *B60W 2520/20* (2013.01)

(58) Field of Classification Search
None
See application file for complete search history.

(56) References Cited

U.S. PATENT DOCUMENTS

| | | | |
|---|---|---|---|
| 2002/0011093 A1 | 1/2002 | Matsuno | |
| 2004/0148077 A1* | 7/2004 | Yasui | .................. B60W 40/101 |
| | | | 701/41 |
| 2010/0114449 A1* | 5/2010 | Shiozawa | .............. B62D 6/005 |
| | | | 701/90 |

FOREIGN PATENT DOCUMENTS

| | | |
|---|---|---|
| DE | 3922528 C1 | 7/1990 |
| EP | 1407949 A1 | 4/2004 |
| EP | 1407950 A1 | 4/2004 |
| EP | 2572947 A1 | 3/2013 |

OTHER PUBLICATIONS

Ahn, C. et al., "Robust Estimation of Road Frictional Coefficient," IEEE Transactions on Control Systems Technology, vol. 21, No. 1, Jan. 2018, XP011482684.
Search Report for Italian Patent Application No. 102021000020948 mailed Mar. 30, 2022.

* cited by examiner

*Primary Examiner* — James M McPherson
*Assistant Examiner* — Bakari Underwood
(74) *Attorney, Agent, or Firm* — CANTOR COLBURN LLP

(57) ABSTRACT

Apparatus for estimating a grip factor of at least one wheel comprising: a control unit configured to process a current slip angle of said wheel; a storage unit, within which, in a consultation table, a plurality of grip curves correlating a plurality of values of a steering parameter comprising the rack force with a plurality of values of the slip angle are recorded; along a same curve, the value of the grip factor remains unchanged; wherein the control unit is configured to cyclically estimate at least one raw value of the grip factor of said at least one wheel based on the position of a current condition within the consultation table, as a function of the current slip angle and of the current rack force.

8 Claims, 5 Drawing Sheets $$\alpha = \beta + \frac{W \cdot a}{v} - \delta$$

$$FV = \frac{\sum_{i=1}^{n} RG_i \cdot Q_i}{\sum_{i=1}^{n} Q_i} \cdot q$$

$$\alpha = \beta + \frac{\Psi \cdot a}{v} - \delta$$

CT $$FV = \frac{\sum_{i=1}^{n} RG_i \cdot Q_i}{\sum_{i=1}^{n} Q_i} \cdot q$$

RF

α

RG

FV

G

APPARATUS AND METHOD FOR ESTIMATING A GRIP FACTOR OF A WHEEL OF A ROAD VEHICLE AND RELATIVE ROAD VEHICLE

CROSS-REFERENCE TO RELATED APPLICATIONS

This patent application claims priority from Italian patent application no. 102021000020948 filed on Aug. 3, 2021, the entire disclosure of which is incorporated herein by reference.

TECHNICAL SECTOR

The invention relates to an apparatus and a method for estimating a grip factor of a wheel of a road vehicle; the invention further relates to the relative road vehicle provided with said apparatus.

PRIOR ART

Algorithms are known, which are used for the punctual, instant-by-instant estimation of the grip of a tyre to the asphalt when a road vehicle drives on a road or track.

In the last few years, different technological solutions were offered and implemented concerning traction controls, brake controls or torque distribution controls for a vehicle. These technologies often make use of apparatuses that exploit a grip factor (for example, a road friction coefficient) to calculate a control parameter or to correct it; therefore, the road friction coefficient has to be estimated with utmost precision in order to safely carry out the control.

Patent application JP6221968 describes a device for estimating the road friction coefficient based on a force acting, along a curve, upon a tyre and the relative self-aligning moment. However, in this technology, a problem lies in the fact that a slip angle of the front wheel cannot be detected and can hardly be estimated by means of a steering angle, so that the conditions allowing for the detection of the road friction coefficient are limited, thus making it difficult for the road friction coefficient to be estimated within a wide driving radius.

Furthermore, prior art technologies entail a punctual estimation, which, in order to define the grip intended as a maximum acceleration that can be reached by a vehicle in a given instant, obviously needs said acceleration to be reached. Otherwise, namely if the grip limit is not reached, the estimate of the grip factor cannot be considered as reliable.

In addition, it often happens, for example in the technology described in document JP6221968, that the estimation of the grip factor takes into account differential values coming from a sensor (for example, the variation of the yaw angle), which is commonly subjected to interferences and, therefore, can cause difficulties in precisely estimating the grip factor, namely the road friction coefficient.

DESCRIPTION OF THE INVENTION

The object of the invention is to provide an apparatus, a method and a relative vehicle for estimating a grip factor of a wheel of a road vehicle, which are at least partially free from the drawbacks described above, are easy and economic to be manufactured and implemented and, in particular, maximize performances and/or safety while driving along a track.

According to the invention, there are provided an apparatus, a method and a relative vehicle for estimating a grip factor of a wheel of a road vehicle according to the appended claims.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
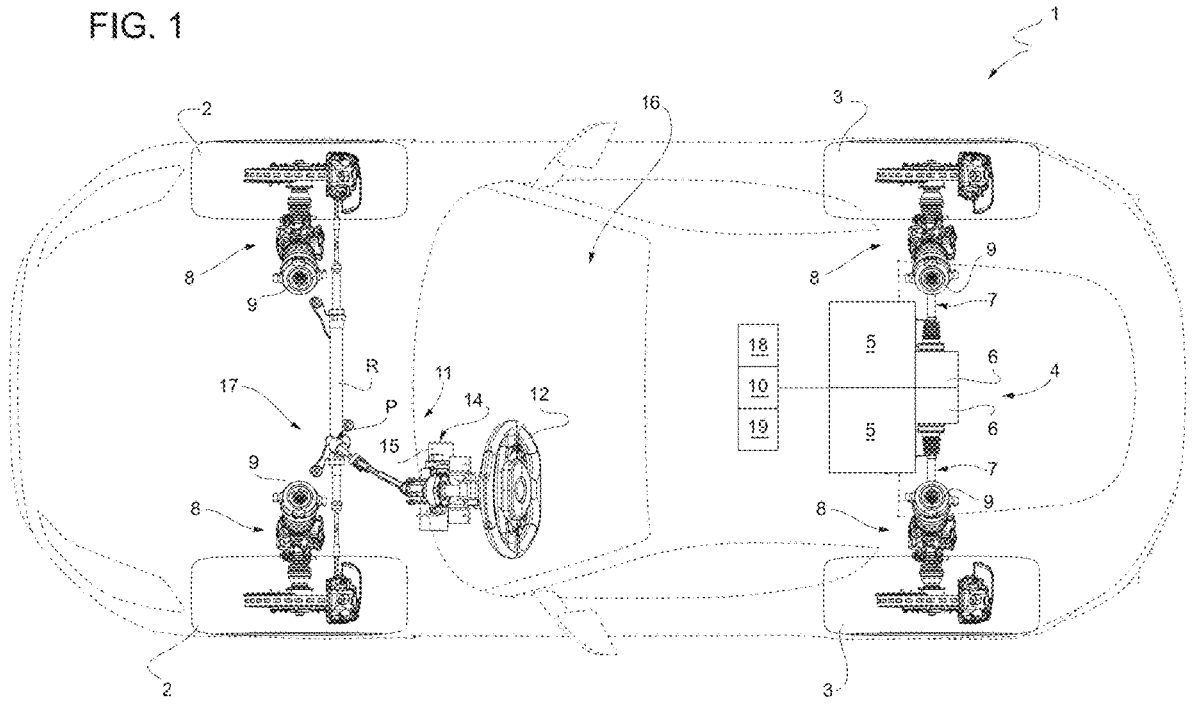
FIG. 1 is a schematic plan view of a road vehicle according to the invention and provided with two separate and independent motors.

In FIG. 1, number 1 indicates, as a whole, a road vehicle provided with two front wheels 2 and two rear drive wheels 3 (hence, belonging to a same axle, namely the rear one), which receive the torque from a powertrain system 4.

Therefore, the powertrain system 4 is configured to deliver a torque to the drive wheels 3 and comprises, for example, at least two electric motors 5, each independently operating a respective drive wheel 3. The electric motors 5 are preferably arranged in a transversely central, longitudinal rear position. Each one of said electric motors 5 is mechanically connected (by means of reduction or transmission elements 6) to the respective wheel 3 through a respective axle shaft 7, which is integral to a respective rear drive wheel 3.

In other non-limiting cases, which are not shown herein, the powertrain system 4 is arranged at the front. Alternatively or in addition, the drive wheels 3 are the front wheels of the road vehicle 1.

According to some non-limiting embodiments, the powertrain system 4 comprises, alternatively or in addition to the electric motors, a heat engine.

Each wheel 2 or 3 is mechanically connected to a frame of the road vehicle 1 by means of a suspension 8 (partially shown in FIG. 1), which is provided with an electronically controlled shock absorber 9, namely provided with an electric actuator, which can change (namely, increase or decrease) the damping of the electronically controlled shock absorber 9. By way of example, the electric actuator of each electronically controlled shock absorber 9 could comprise one or more solenoid valves, which modulate the dimension of the holes for the passage of oil inside the electronically controlled shock absorber 9, or it could comprise a magnetic-rheological fluid, which changes its physical properties depending on an applied magnetic field.

The road vehicle 1 comprises an electronic control unit 10 ("ECU"), which, among other things, processes a plurality of data items and adjusts the behaviour of the road vehicle 1 both while it drives along a straight road and while it drives along a curve by acting, as described more in detail below, for example, upon the torque delivered by the electric motors 5 to the drive wheels 3 and, if necessary, in collaboration with the shock absorbers 9 of the suspensions 8. The control unit 10 can physically consist of one single device or of different devices separate from one another and communicating with one another through the CAN network of the road vehicle 1.

Furthermore, the vehicle 1 preferably comprises a steering system 11, which extends from a steering wheel 12 to a suspension of the road vehicle 8. In particular, the steering system comprises a pinion P and a rack R, which cause the rotation of the wheels relative to the vertical. The steering system 11 preferably comprises a power steering 14 provided with an electric actuator 15, which makes the rotation of the steering wheel 12 easier for a driver of the road vehicle 1. Therefore, the rack force RF is preferably supplied to the control unit 10 by the power steering 14.

Advantageously, the vehicle 1 comprises an apparatus 16 for estimating a grip factor F (FIG. 3) (hereinafter, also referred to as grip G) of at least one wheel 2, 3 of the road vehicle 1. In particular, the grip G is numerically equal to the total maximum acceleration $A_{TOT}$ that can be reached by the vehicle 1 in a given time instant. In other words, the grip G is numerically equal to the square root of the sum of the squares of the lateral acceleration Ay and of the longitudinal acceleration Ax (simply according to the Pythagorean theorem).

The apparatus 16 comprises at least one steering factor detecting device 17, which is configured to cyclically detect at least one of the steering parameters comprising a current rack force RF applied to the steering system 11 of the road vehicle 1. The advantage of this information is that the rack force RF is strongly related to the aligning moment of the wheels 2, 3, which has an advancing character, since it reaches its saturation before the grip limit of the tyre. Therefore, in detail, by identifying the deviation of the aligning moment (namely, of the rack force RF, unless there is a multiplying factor) from the linear branch relative to the slip angle $\alpha$, it is possible to obtain early information on the grip G.

Advantageously, the apparatus 16 further comprises detection elements 18 configured to cyclically detect current state variables of the road vehicle 1. In particular, the current state variables detected by the detection elements are at least the speed V of the vehicle 1 (FIG. 2), which is preferably detected by means of speed sensors arranged in the area of the wheels 2, 3; and, for example, by means of one or more inertial measuring units (which are known and, therefore, will not be described in detail,) the yaw rate $\Psi'$ of the road vehicle 1.

Figure 2:
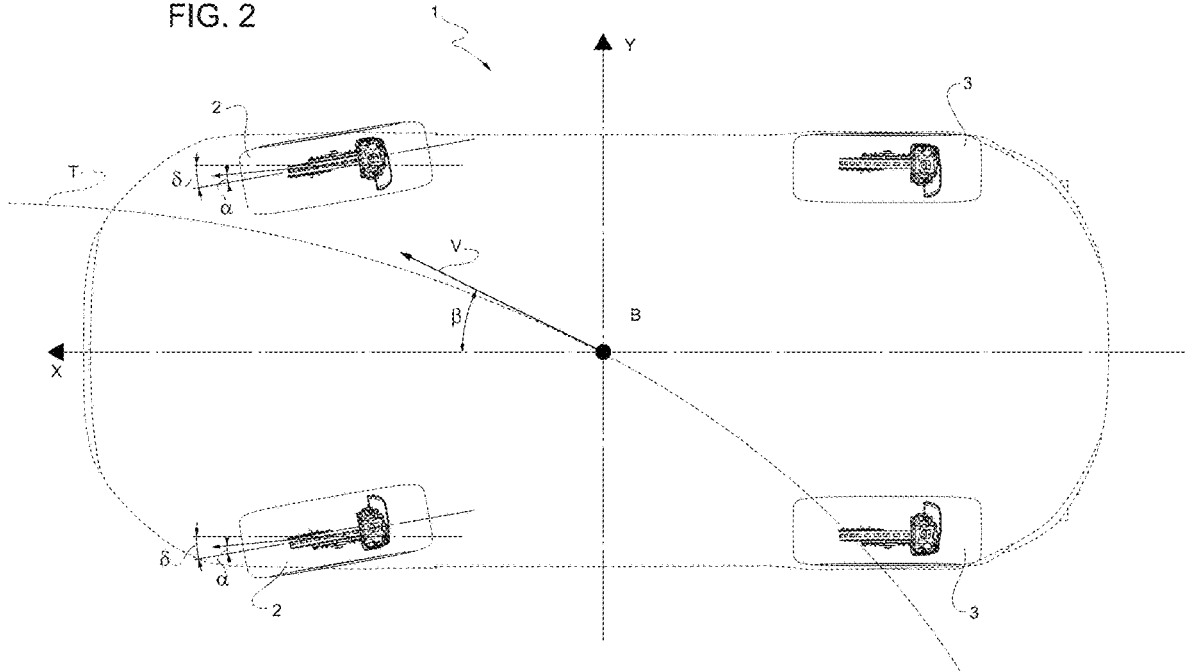
FIG. 2 is a schematic view of the road vehicle of FIG. 1 while driving along a curve, highlighting the trajectory, the driving speed and the attitude angle.

According to the non-limiting embodiment of FIG. 2, advantageously, though not necessarily, the control unit 10 is configured to process, when driving along a curve, an attitude angle $\beta$ of the road vehicle 1 (namely, the angle comprised between the longitudinal axis x of the road vehicle 1 and the direction of the driving speed V of the road vehicle 1 in the centre of gravity B). It should be pointed out that the attitude angle $\beta$ is different from the yaw angle (namely, the angle comprised between the longitudinal axis x of the road vehicle 1 and a fixed ground reference), since the road vehicle 1 can assume the same yaw angle in the plane, though assuming very different attitude angles $\beta$ and vice versa.

Preferably, the control unit 10 is configured to process the steering angle $\delta$ (shown in the non-limiting embodiment of FIG. 2) of the wheel 2, 3 as a function of the angle of the steering wheel 12.

Advantageously, the control unit 10 is configured to cyclically process, as a function of the current state variables V, $\Psi'$ of the vehicle and, preferably, of the attitude angle $\beta$ and of the steering angle $\delta$, a current slip angle $\alpha$ of said wheel 2, 3 of the road vehicle 1. In particular, the slip angle $\alpha$ is processes by means of the following formula:

$$\alpha = \beta + \frac{\Psi' \cdot a}{V} - \delta$$

wherein "a" indicates half the wheel base of the axle on which the slip angle is being calculated, namely the front axle in FIG. 2.

Advantageously, the apparatus 16 further comprises a storage unit 19, where a plurality of grip curves GC are recorded in a consultation table CT (FIG. 4), said grip curves GC correlating a plurality of values of the rack force RF with a plurality of values of the slip angle $\alpha$. In detail, the value of the grip factor G remains unchanged along a same curve GC. In other words, the curves GC indicate the grip value G upon variation of the slip angle $\alpha$ (corresponding to the abscissa axis in the table CT of FIG. 4) and upon variation o the rack force RF (corresponding to the ordinate axis in the table CT of FIG. 4). Hence, in particular, the table CT links the slip angle $\alpha$ (of the front axle), the rack force RF, namely the aligning moment (of the front axle), and different grip levels G.

The control unit 10 is further configured to cyclically estimate at least one raw value RG of the grip factor G of said at least one wheel 2, 3 based on the position of a current condition AC within the consultation table CT, as a function of the current slip angle $\alpha$ and of the current rack force RF. In particular, the estimation of the raw value RG is carried out by the control unit in real time.

Advantageously, though not necessarily, the plurality of grip curves GC are defined only once (namely, one time, in particular during a design and test phase) for each model of the road vehicle 1, testing it o surfaces whose grip factor G has a known value. By way of example, curve GC1 is empirically processed by driving the vehicle 1 along a track in the presence of the maximum grip G (with a unitary lateral friction coefficient) with a dry asphalt and under perfect conditions; curve GC2 is empirically processed by driving the vehicle 1 on a track especially wet for the purpose (with a lateral frication coefficient of 0.8); curve GC3 is empirically processed by driving the vehicle 1 on a properly flooded track (with a lateral friction coefficient of 0.6); and curve GC4 is empirically processed by driving the vehicle 1 on a track with an icy road surface (for example, in Nordic countries permitting these conditions—with a lateral friction coefficient of 0.4). In this way, the consultation table CT can be populated with a plurality of curves GC (even more than the ones schematically shown in FIG. 4), which enable a raw—though punctual—estimation of the grip G instant by instant.

Advantageously, though no necessarily, each one of the grip curves GC relating the steering parameter comprising the rack force RF to the slip angle $\alpha$ is determined in at least one predefined dynamic condition.

In particular, the predefined dynamic condition is a stationary condition, namely during which the lateral acceleration Ay and/or the longitudinal speed of the vehicle 1 are constant; generally speaking, these conditions always occur at least once while driving along a curve and, in particular, close to the centre of the curve.

Therefore, advantageously, though not in a limiting manner, the control unit 10 is configured to carry out the estimation of the grip factor G when the current dynamic condition at least partially corresponds to the predefined dynamic condition; in other words, when the current dynamic condition 1 corresponds to a stationary condition (in accordance with what described above). In this way, a real-time estimation can be performed, exclusively selecting current scenarios in stationary conditions.

In the non-limiting embodiment of the accompanying figures, the control unit 10 is configured to process a final value FV of the grip factor G by filtering the raw value RG of the grip factor G as a function of at least one reliability index Q. In particular, the control unit 10 is configured to perform a weighted average of the last "n" raw values RG, wherein the weight is given by the reliability index Q. More in particular, the final value FV of the grip factor G is processed by means of the following formula:

$$FV = \frac{\sum_{i=1}^{n} RG_i \cdot Q_i}{\sum_{i=1}^{n} Q_i}$$

which clearly shows that the final value FV corresponds to the weighted moving average of the raw value RG, wherein the weight is given by the reliability index Q. In this way, it is possible to filter those interferences/noises to which the signals detected by the detecting means 18 are normally subjected. In other words, this defines a buffer of "n" instants for which a raw value RG and a reliability index Q are available, with which a weighted average is calculated giving more importance to more reliable values RG.

According to some non-limiting embodiments, the reliability index Q comprises at least one reliability criterion C' given by the ratio between the raw value RG and the lateral acceleration reached at the time of estimation. In other words, in accordance with what indicated above concerning the definition of the factor G, the reliability criterion C' is a value raging from 0 to 1 (as a matter of fact, there cannot be a lateral acceleration Ay, in a given instant, that is greater than the grip G). Therefore, the greater the value of the criterion C', the more reliable the estimation of the grip G.

Alternatively or in addition, the reliability index Q comprises at least one reliability criterion C", which is calibrated as a function of the current slip angle α at the time of estimation of the grip G. In this case, again, the reliability criterion C" is preferably calibrated, for example, by means of a suitable table, which distributes the value thereof in numbers ranging from 0 to 1.

In particular, in case there are several reliability criteria C', C", the reliability index Q is processed by multiplying said several reliability criteria C', C".

Figure 4:
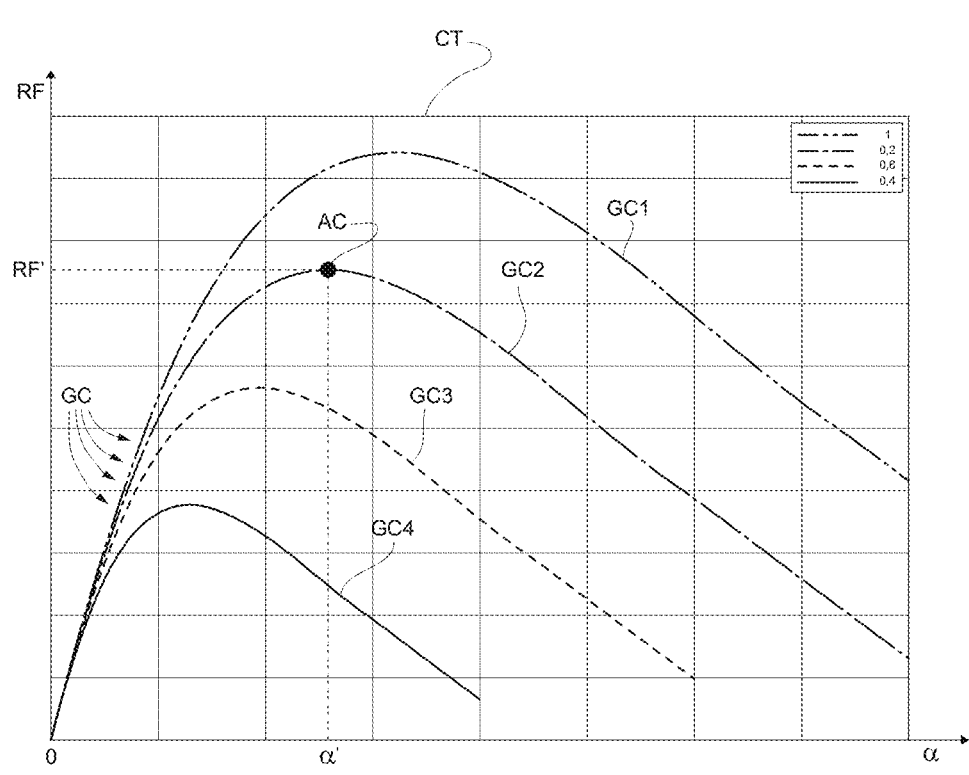
FIG. 4 schematically shows a consultation table correlating a slip angle with a steering force in order to obtain a raw value of the grip factor.

In particular, the criterion C' and/or the criterion C" are based on the fact that the grip curves GC of the diagram of FIG. 4 substantially tend to separate from one another as the slip angle α increases (and, therefore, indirectly, as the lateral acceleration Ay increases). As a consequence, the separation of the grip curves GC leads to an estimation of the grip G (in particular, the raw value RG) that is less affected by the errors of the input signals (the rack force RF and the signals necessary for the calculation of the slip angle α), which, for their nature, are subjected to deviation and/or oscillations.

In some non-limiting cases, the control unit 10 is configured to define reliable and, hence, use the estimations in which the reliable index Q is greater than 0.7; in other words, when the probability that the raw estimation RG is reliable is equal to or greater than 70%.

According to a further aspect of the invention, there is provided a method for estimating the grip factor G (namely, RG or FV) of at least one wheel 2, 3 of a road vehicle 1.

What described so far in relation to the vehicle 1 and to the apparatus 16 also applies to the method described in detail below.

In particular, the method comprises the steps of:
cyclically detecting the steering parameter comprising the current rack RF force applied to the steering system 11 of the road vehicle 1, which extends from the steering wheel 12 to a suspension 8 of the road vehicle;
cyclically detecting the aforesaid current state variables of the vehicle 1;
cyclically processing, as a function of the current state variables of the vehicle 1, the current slip angle α of the wheel 2, 3 of the road vehicle 1;
determining and storing, once, in the storage unit 19, in the consultation table CT, the grip curves GC correlating a plurality of values of the rack force RF with a plurality of values of the slip angle α; wherein the value of the grip factor G remains unchanged along a same curve GC;
cyclically estimating at least one raw value RG of the grip factor G of the wheel 2, 3 based on the position of a current condition AC within the consultation table CT, as a function of the current slip angle α and the current rack force RF.

Advantageously, though not necessarily, the method comprises the further step of processing the final value FV of the grip factor G by filtering the raw value RG of the grip factor G as a function of the reliability index Q.

In particular, the method entails performing a weighted average of the last n raw values GR, wherein the weight is given by the reliability index Q. To this regard, please take into account what described above.

Even though the invention described above relates to some specific embodiments, it should not be considered as limited to said embodiments, for its scope of protection also includes all those variants, changes or simplifications covered by the appended claims, such as for example different reliability criteria, a different conformation of the vehicle and of its steering systems as well as powertrain systems, etc.

Figure 3:
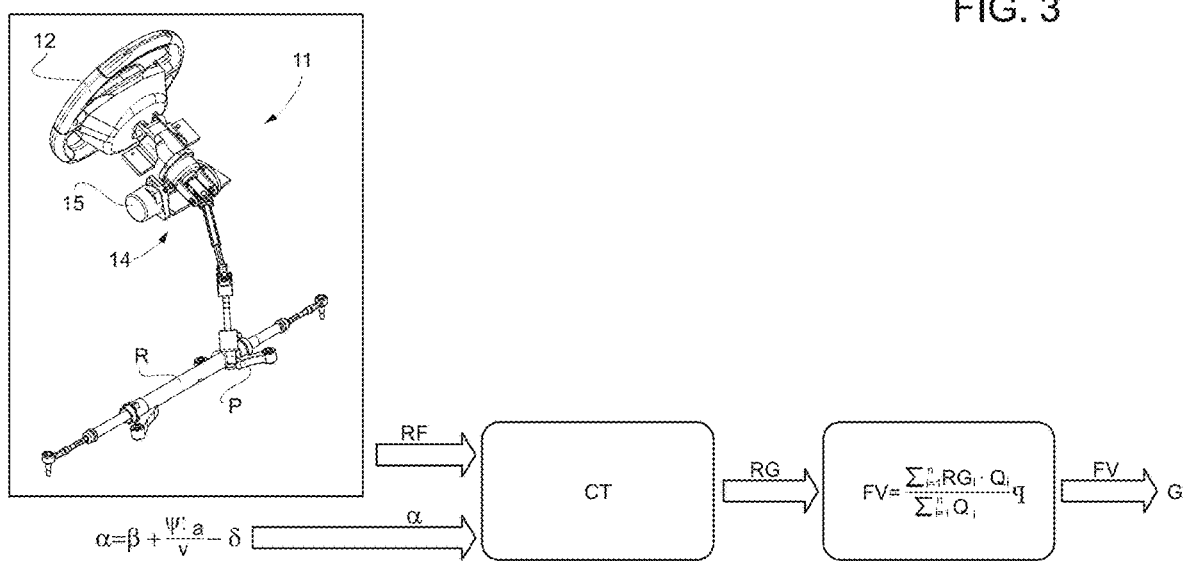
FIG. 3 is a schematic diagram showing the logic structure of a control according to the invention.

In the non-limiting embodiment of FIG. 3, in use, according to the method, the control unit 10 is inputted with the rack force RF and the estimated slip angle α and, through these items of information, accesses the consultation table CT populated by means of experimental acquisitions of the curves GC.

Therefore, the consultation table CT (shown in FIG. 4) is accessed with slip angle α and rack force RF and produces the raw value RG of the grip factor G. Within the table CT, the combination between current slip angle α (a' in FIG. 4) and current rack force RF (RF in FIG. 4) defines the grip raw value RG (namely, the curve GC) on which the vehicle 1 is standing.

In this way, a first-level raw item of information concerning the grip G is obtained. This item of information is then filtered through the estimation reliability criteria C', C", which allow for a shift from a highly oscillating estimation to a more stable and usable estimation.

In particular, as mentioned above, the reliability criteria C' and C" are calculated in the instants in which the vehicle 1 is in the same dynamic conditions in which the curves GC of the consultation table CT were defined.

Figure 5:
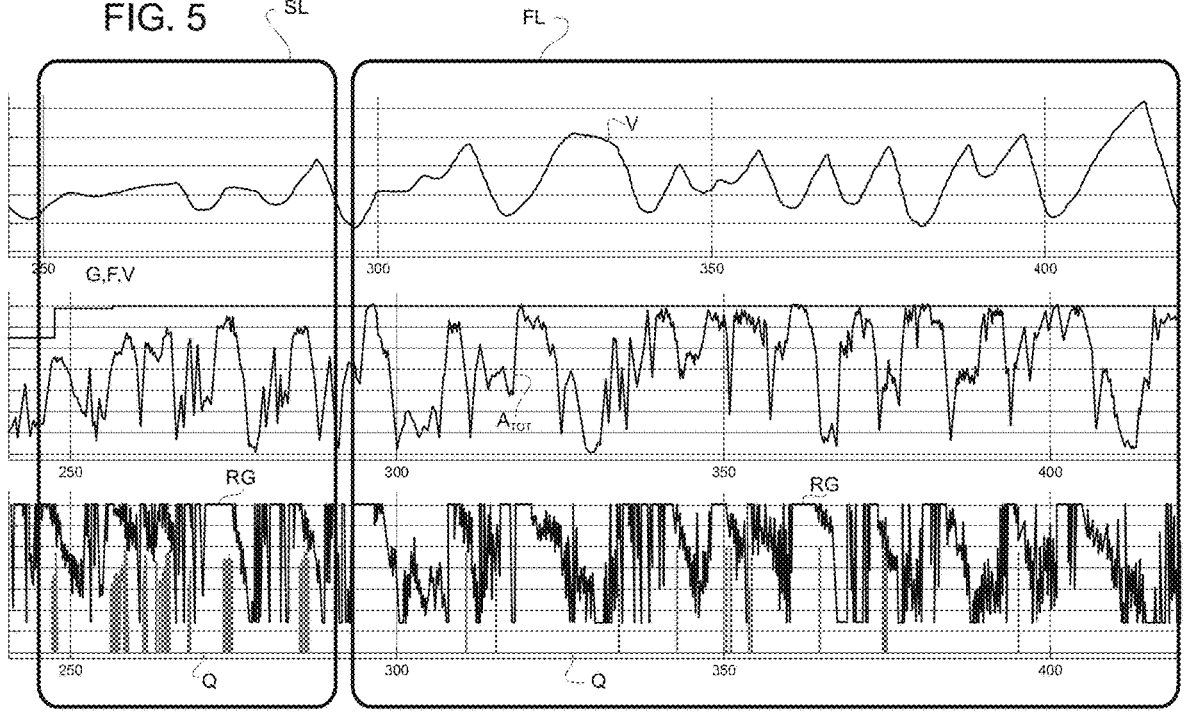
FIG. 5 shows some examples of the results obtained by an apparatus according to the invention.

FIG. 5 shows an example of the operation of the preemptive estimation of the grip factor G of the vehicle 1. In particular, the figure shows three different diagrams (an upper one, an intermediate one and a lower one) divided into two boxes SL and FL, which respectively indicate the behaviours of the vehicle 1 during slow laps SL (test or parade lap), during which there is an acceleration $A_{TOT}$ that does not reach the maximum, and fast laps, so-called flying laps, during which the maximum acceleration possible (namely, the ideal value of the grip factor G) for the vehicle 1 is reached.

In particular, during the slow laps, one can clearly see the advancing character of the estimation of the grip factor G (namely, of the final value FV) shown in the intermediate diagrams. More in particular, already from the first curves, during which the total acceleration $A_{TOT}$ reaches circa 70% of its maximum, thus reaching a given slip angle α, it allows the reliability index Q to define the estimation of the raw value RG as reliable. The success of the estimation, namely the instants in which it is deemed reliable by the control unit 10, are highlighted by the peaks of the signal Q shown in the diagram, which correspond, in turn, to the moments in which the vehicle 1 is in dynamic conditions corresponding to those in which the grip curves GC were determined (namely, stationary conditions/curve centre conditions as mentioned above). Therefore, it is evident that, unlike prior art solutions, thanks to the method and the apparatus described above, even without ever reaching the maximum acceleration $A_{TOT}$, the estimated grip G, FV substantially reaches the definitive value (intermediate diagram), which turns out to be truthful because of the fact that, in the flying laps FL, it corresponds to the maximum acceleration $A_{TOT}$ reached by the vehicle 1. In detail during the flying laps FL, the stationary instants in which the estimations are deemed reliable are more spread apart from one another compared to the slow laps SL, simply because they last much less than the other phases, since the vehicle is subjected to quicker dynamics.

The vehicle, the apparatus and the method described above have many advantages.

First of all, they can estimate the grip value G in a pre-emptive manner and do not estimate it in a punctual manner (as if it were a measurement).

Furthermore, when the estimated value of the factor G quickly increases, it allows the performances of the road vehicle 1 to be increased, since the definition of the torque that the powertrain system can transmit to the (rear) drive wheels 3 can be more precise, thus decreasing the risk of causing overslip of the drive wheels 2 with consequent performance dissipation and reduction.

In addition, if the estimation of the grip value G, namely the grip G, quickly decreases, this leads to an increase in the safety and easiness of driving of the vehicle 1. In particular, in case of a quick decrease in the grip G (for example, due to a wet road, a change in the asphalt, etc.), it is possible to have the control unit 10 avoid operations that are typical for a high grip (for example, in the suspension control), which could cause undesired effects on the vehicle 1 that is moving under low-grip conditions.

Finally, the control method described above is simple and economic to be implemented in a road vehicle 1, for it does not require the addition of any physical component and can completely be carried out via software, exploiting architectures that normally are already present on board the road vehicle 1. It should be pointed out that the method described above does not use either a high computing ability or a large memory space and, therefore, it can be implemented in a control unit with no need for updates or boosts.

| LIST OF THE REFERENCE NUMBERS OF THE FIGS. | |
|---|---|
| 1 | road vehicle |
| 2 | front wheels |
| 3 | rear wheels |
| 4 | powertrain system |
| 5 | electric motors |
| 6 | reduction gear |
| 7 | axle shaft |
| 8 | suspension |
| 9 | shock absorber |
| 10 | control unit |
| 11 | steering system |
| 12 | steering wheel |
| 14 | power steering |
| 15 | actuator |
| 16 | apparatus |
| 17 | detecting device |
| 18 | detection elements |
| 19 | storage unit |
| AC | current condition |
| $A_{TOT}$ | total acceleration |
| Ay | lateral acceleration |
| B | centre of gravity |
| C' | reliability criterion |
| C" | reliability criterion |
| CT | consultation table |
| FL | fast lap |
| FV | final value |
| G | grip |
| GC | grip curves |
| P | pinion |
| Q | reliability index |
| R | rack |
| RA | rear axle |
| RF | rack force |
| RG | raw value |
| SL | slow lap |
| T | trajectory |
| V | speed |
| Vx | longitudinal speed |
| x | longitudinal axis |
| y | lateral axis |
| α | slip angle |
| β | attitude angle |
| δ | steering angle |
| Ψ' | yaw rate |

The invention claimed is:

1. An apparatus (16) for estimating a grip factor (G) of at least one wheel (2, 3) of a road vehicle (1); the apparatus (16) comprising:

at least one steering factor detecting device (17) physically connected to a steering system (11) of the road vehicle and configured to cyclically detect at least one of the steering parameters comprising an actual rack (RF) force (R) applied to the steering system (11) of the road vehicle (1), which extends from a steering wheel to a suspension (8) of the road vehicle (1);

detection elements (18) comprising at least one sensor selected from a speed sensor, an inertial measurement unit, and a yaw rate sensor, each physically mounted on the road vehicle (1) and configured to cyclically detect actual vehicle state variables (1);

a control unit (10) operatively connected to the at least one steering factor detecting device (17) and the detection elements (18), and further configured to receive real-time sensor data and further configured to cyclically process, depending on at least the actual state variables of the vehicle (1), an actual slip angle ($\alpha$) of said wheel (2, 3) of the road vehicle (1);

a storage unit (19), within which, in a consultation table (CT), a plurality of grip curves (GC) correlating a plurality of values of the steering parameter comprising the rack force (RF) to a plurality of values of the slip angle ($\alpha$) are recorded; wherein on a same curve, the value of the grip factor (G) remains constant;

wherein the control unit (10) is configured to cyclically estimate at least one raw value (RG) of the grip factor (G) of the at least one wheel (2, 3) based on the position of a current condition (AC) within the consultation table (CT), as a function of the actual slip angle ($\alpha$) and the actual rack force (RF);

wherein the control unit (10) is configured to process a finite value (FV) of the grip factor (G) by filtering the raw value (RG) of the grip factor (G) according to at least one reliability index (Q); in particular, the control unit (10) is configured to perform a weighted average of the last n raw values (RG) wherein the weight is given by the reliability index (Q); and wherein the control unit (10) is further configured to output the estimated grip factor (G) to at least one vehicle control system, and to adjust at least one vehicle control parameter selected from torque delivery, braking force, or suspension damping, based on the estimated grip factor (G), thereby improving the performance and safety of the road vehicle (1).

2. The apparatus (16) according to claim 1, wherein the plurality of grip curves (GC) is defined once for each model of the road vehicle (1) by testing it on surfaces whose grip factor (G) has a known value.

3. The apparatus (16) according to claim 1, wherein each of the grip curves (GC) relating the steering parameter comprising the rack force (RF) and the slip angle ($\alpha$) is determined in at least one predefined dynamic condition; in particular, the control unit (10) is configured to perform the estimation of the grip factor (G) when a current dynamic condition corresponds at least partially to the predefined dynamic condition.

4. The apparatus (16) according to claim 3, wherein the predefined dynamic condition is a stationary condition, i.e., during which the lateral acceleration and/or the longitudinal velocity of the vehicle (1) are constant.

5. The apparatus (16) according to claim 1, wherein the reliability index (Q) comprises at least a first reliability criterion (C') given by the ratio between the raw value (RG) and lateral acceleration (Ay) reached at the time of estimation.

6. The apparatus (16) according to claim 1, wherein the reliability index (Q) comprises at least a second reliability criterion (C"), which is calibrated as a function of the actual slip angle ($\alpha$) at the time of estimation; in the case where there is more than one reliability criterion, the reliability index (Q) is elaborated by multiplying the more than one reliability criterion among them.

7. Apparatus (16) according to claim 1, wherein the control unit (10) is configured to define reliable and thus use estimates wherein the reliability index (Q) is greater than 0.7.

8. A road vehicle (1) including:

at least two drive wheels;

a powertrain system (4) configured to deliver torque to the at least two drive wheels;

the apparatus (16) according to claim 1;

wherein the control unit (10) is configured to adjust the torque transmitted by the powertrain system (4) to the drive wheels and/or to arrange control systems according to the value of the estimated grip factor (G); so as to increase performance and safety of the road vehicle (1) respectively.

\* \* \* \* \*